US007181225B1

(12) United States Patent
Moton, Jr. et al.

(10) Patent No.: US 7,181,225 B1
(45) Date of Patent: Feb. 20, 2007

(54) SYSTEM AND METHOD FOR SURVEYING WIRELESS DEVICE USERS BY LOCATION

(75) Inventors: Robert T. Moton, Jr., Alpharetta, GA (US); Mark J. Enzmann, Roswell, GA (US); Samuel N. Zellner, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 507 days.

(21) Appl. No.: 09/739,162

(22) Filed: Dec. 19, 2000

(51) Int. Cl.
*H04Q 7/20* (2006.01)

(52) U.S. Cl. .............................. 455/456.1; 455/456.2; 455/414.2

(58) Field of Classification Search ............. 455/414.2, 455/414.3, 456.1, 456.2, 456.3, 456.5, 456.6
See application file for complete search history.

(56) References Cited

U.S. PATENT DOCUMENTS

| | | | |
|---|---|---|---|
| 4,757,267 A | 7/1988 | Riskin | 379/114.24 |
| 5,303,393 A * | 4/1994 | Noreen et al. | 455/3.02 |
| 5,511,111 A | 4/1996 | Serbetcioglu et al. | 379/67 |
| 5,512,908 A | 4/1996 | Herrick | 342/387 |
| 5,566,235 A | 10/1996 | Hetz | 379/221.02 |
| 5,588,042 A | 12/1996 | Comer | 379/59 |
| 5,596,625 A | 1/1997 | LeBlanc | 455/404.2 |
| 5,610,973 A | 3/1997 | Comer | 379/59 |
| 5,625,364 A | 4/1997 | Herrick et al. | 342/449 |
| 5,657,375 A | 8/1997 | Connolly et al. | 455/436 |
| 5,663,734 A | 9/1997 | Krasner | |
| 5,701,301 A | 12/1997 | Weisser, Jr. | 370/428 |
| 5,727,057 A | 3/1998 | Emery et al. | 379/201.07 |
| 5,771,283 A | 6/1998 | Chang et al. | 379/142.01 |
| 5,819,155 A * | 10/1998 | Worthy et al. | 455/2.01 |
| 5,838,774 A | 11/1998 | Weisser, Jr. | 379/92.02 |
| 5,852,775 A | 12/1998 | Hidary | 455/404 |
| 5,875,401 A | 2/1999 | Rochkind | 455/466 |

(Continued)

FOREIGN PATENT DOCUMENTS

WO    WO 98/19484    5/1998

(Continued)

OTHER PUBLICATIONS

"Wireless Application Protocol", Oct. 1999 Wireless Internet Today, pp. 1-20.

(Continued)

*Primary Examiner*—Temica Beamer
(74) *Attorney, Agent, or Firm*—Merchant & Gould LLC

(57) ABSTRACT

The present invention is a system and method for conducting survey using wireless devices. The system architecture of the present invention comprises a location server and a location system. The location server can receive a survey request from a subscriber, delineate a survey area for the survey, broadcast a query containing the survey to a plurality of wireless devices, process responses received from the wireless devices, and delivers a result of the survey to the subscriber. The location system can generate location information for each of the wireless devices that received the query. The location system may be a network-based unit or a portable unit provisioned at each of the wireless devices. In the preferred embodiment, the location system is a GPS receiver that generates the longitude and the latitude of the wireless device at which it is provisioned.

56 Claims, 6 Drawing Sheets

U.S. PATENT DOCUMENTS

| | | | | |
|---|---|---|---|---|
| 5,903,636 | A | 5/1999 | Malik | 379/142.01 |
| 5,949,867 | A | 9/1999 | Sonnenberg | 379/211.02 |
| 5,961,593 | A | 10/1999 | Gabber et al. | 709/219 |
| 6,011,975 | A | 1/2000 | Emery et al. | 455/456.1 |
| 6,028,921 | A | 2/2000 | Malik et al. | 379/201.04 |
| 6,085,086 | A | 7/2000 | La Porta et al. | 455/432 |
| 6,101,381 | A | 8/2000 | Tajima et al. | 455/414 |
| 6,138,003 | A | 10/2000 | Kingdon et al. | 455/410 |
| 6,157,829 | A | 12/2000 | Grube et al. | 455/414 |
| 6,184,829 | B1 | 2/2001 | Stilp | 342/387 |
| 6,185,426 | B1 | 2/2001 | Alperovich et al. | 455/456.1 |
| 6,208,854 | B1 | 3/2001 | Roberts et al. | 455/417 |
| 6,208,866 | B1 | 3/2001 | Rouhollahzadeh et al. | 455/456 |
| 6,233,329 | B1 | 5/2001 | Urban et al. | 379/142.1 |
| 6,259,405 | B1 | 7/2001 | Stewart et al. | 342/457 |
| 6,311,069 | B1 | 10/2001 | Havinis et al. | 455/456.4 |
| 6,321,092 | B1 | 11/2001 | Fitch et al. | 455/456 |
| 6,324,396 | B1 | 11/2001 | Vasa et al. | 455/415 |
| 6,353,664 | B1 | 3/2002 | Cannon et al. | 379/142.1 |
| 6,377,810 | B1 | 4/2002 | Geiger et al. | 455/456.2 |
| 6,385,591 | B1 | 5/2002 | Mankoff | 705/14 |
| 6,418,308 | B1 * | 7/2002 | Heinonen et al. | 455/414.3 |
| 6,421,441 | B1 | 7/2002 | Dzuban | 379/221.09 |
| 6,442,391 | B1 | 8/2002 | Johansson et al. | 455/456 |
| 6,442,687 | B1 | 8/2002 | Savage | 713/156 |
| 6,449,497 | B1 | 9/2002 | Kirbas et al. | 455/564 |
| 6,463,533 | B1 | 10/2002 | Calamera et al. | 713/163 |
| 6,470,378 | B1 | 10/2002 | Tracton et al. | 709/203 |
| 6,473,626 | B1 | 10/2002 | Nevoux et al. | 455/560 |
| 6,477,382 | B1 * | 11/2002 | Mansfield et al. | 455/458 |
| 6,484,148 | B1 | 11/2002 | Boyd | 705/14 |
| 6,496,931 | B1 | 12/2002 | Rajchel et al. | 713/168 |
| 6,505,046 | B1 | 1/2003 | Baker | 455/456.3 |
| 6,505,048 | B1 | 1/2003 | Moles et al. | 455/456.1 |
| 6,505,049 | B1 | 1/2003 | Dorenbosch | 455/456.2 |
| 6,505,163 | B1 | 1/2003 | Zhang et al. | 704/275 |
| 6,522,876 | B1 | 2/2003 | Weiland et al. | 455/414 |
| 6,545,596 | B1 | 4/2003 | Moon | 340/425.5 |
| 6,546,257 | B1 | 4/2003 | Stewart | 455/456 |
| 6,560,442 | B1 * | 5/2003 | Yost et al. | 455/423 |
| 6,560,461 | B1 | 5/2003 | Fomukong et al. | 455/456 |
| 6,618,593 | B1 | 9/2003 | Drutman et al. | 455/456.3 |
| 6,622,016 | B1 | 9/2003 | Sladek et al. | 455/414.1 |
| 6,628,928 | B1 * | 9/2003 | Crosby et al. | 455/77 |
| 6,628,938 | B1 | 9/2003 | Rachabathuni et al. | 455/414 |
| 6,647,257 | B2 | 11/2003 | Owensby | 455/414.1 |
| 6,647,269 | B2 * | 11/2003 | Hendrey et al. | 455/3.03 |
| 6,662,014 | B1 | 12/2003 | Walsh | 455/456.2 |
| 6,675,017 | B1 | 1/2004 | Zellner et al. | 455/456 |
| 6,738,808 | B1 | 5/2004 | Zellner et al. | 709/223 |
| 6,819,929 | B2 | 11/2004 | Antonucci et al. | 455/445 |
| 6,850,758 | B1 | 2/2005 | Paul et al. | 455/422.1 |
| 2001/0034709 | A1 | 10/2001 | Stoifo et al. | 705/51 |

FOREIGN PATENT DOCUMENTS

| | | |
|---|---|---|
| WO | WO 99/27716 | 6/1999 |

OTHER PUBLICATIONS

Mark Moeglein, et al., "An Introduction to Snap Track Server-Aided GPS Technology", available at http://www.snaptrack.com/atwork.html.

U.S. Appl. No. 09/739,339.

U.S. Appl. No. 09/739,340.

U.S. Appl. No. 09/606,535.

U.S. Appl. No. 09/606,534.

U.S. Appl. No. 09/630,134.

U.S. Appl. No. 09/739,315.

"Signal Soft Wireless Location Services", available at http://www.signalsoftcorp.com/products/location_manager.html.

U.S. Official Action dated Aug. 30, 2005 cited in U.S. Appl. No. 10/704,775.

U.S. Official Action dated Oct. 4, 2005, cited in U.S. Appl. No. 10/819,940.

U.S. Appl. No. 09/740,414, entitled "Location Blocking Service from a Wireless Service Provider," filed Dec. 19, 2000, Inventors: Samuel N. Zellner; Mark J. Enzmann; and Robert T. Moton Jr.

U.S. Appl. No. 09/740,372, entitled "Identity Blocking Service from a Wireless Service Provider," filed Dec. 19, 2000, Inventors: Samuel N. Zellner; Mark J. Enzmann; and Robert T. Moton Jr.

U.S. Appl. No. 10/704,775, entitled "Location Blocking Service for Wireless Networks," filed Nov. 12, 2003, Inventors: Samuel N. Zellner; Mark J. Enzmann; and Robert T. Moton Jr.

U.S. Appl. No. 10/819,940, entitled "Anonymous Location Service for Wireless Networks," filed Apr. 8, 2004, Inventors: Samuel N. Zellner; Mark J. Enzmann; and Robert T. Moton Jr.

U.S. Official Action dated Feb. 12, 2003 in U.S. Appl. No. 09/630,134.

U.S. Official Action dated Jul. 10, 2003 in U.S. Appl. No. 09/630,134.

U.S. Official Action dated Jun. 7, 2004 in U.S. Appl. No. 09/630,134.

U.S. Official Action dated Jan. 13, 2005 in U.S. Appl. No. 09/630,134.

U.S. Official Action dated Jun. 21, 2004 in U.S. Appl. No. 09/739,315.

U.S. Official Action dated Feb. 9. 2005 in U.S. Appl. No. 09/739,315.

U.S. Official Action dated Mar. 12, 2004 in U.S. Appl. No. 09/739,340.

U.S. Official Action dated Dec. 10, 2004 in U.S. Appl. No. 09/739,340.

U.S. Official Action dated May 16, 2003 in U.S. Appl. No. 09/740,372.

U.S. Official Action dated Oct. 30, 2003 in U.S. Appl. No. 09/740,372.

U.S. Official Action dated Apr. 15, 2004 in U.S. Appl. No. 09/740,372.

U.S. Official Action dated Nov. 2, 2004 in U.S. Appl. No. 09/740,372.

U.S. Official Action dated Nov. 10, 2003 in U.S. Appl. No. 09/740,414.

U.S. Official Action dated Apr. 21, 2004 in U.S. Appl. No. 09/740,414.

U.S. Official Action dated Oct. 5, 2004 in U.S. Appl. No. 09/740,414.

PCT International Search Report, PCT/US01/22295.

Microsoft Mobility Developer Conference 2003.

3rd Generation Partnership Project: Technical Specification Group Services and System Aspects; Functional Stage 2 Description of Location Services in UMTS (1999).

http://www.openwave.com/us/news_room/press_releases/2001/20010320, "Open Wave Announces Availability to End-to-End Set of Location Services for Wireless Internet".

U.S. Official Action dated Aug. 30, 2005 cited in U.S. Appl. No. 10/704,775.

U.S. Official Action dated Oct. 4, 2005, cited in U.S. Appl. No. 10/819,940.

* cited by examiner

SYSTEM AND METHOD FOR SURVEYING WIRELESS DEVICE USERS BY LOCATION

BACKGROUND

1. Field of the Invention

The present invention relates to telecommunication systems, and in particular, to a system and method for conducting survey using wireless devices.

2. Background of the Invention

The use of wireless devices is increasing at a rapid rate. A majority of the people living in large metropolitan areas use one or more wireless devices on a daily basis. These people communicate with each other or access information on the Internet using, among other devices, wireless telephones, interactive pagers, personal digital assistants, and handheld computers. As technology continues to improve, wireless devices will become more useful; at the same time, they will decrease in size and weight, making them more portable than ever. Consequently, consumers may carry their wireless devices wherever they go. For some people, their wireless devices will become indispensable.

The widespread use of wireless telephones in the United States has prompted the Federal Communications Commission (FCC) to promulgate new rules related to emergency call processing. The FCC's wireless Enhanced 911 (E911) rules require certain Commercial Mobile Radio Services (CMRS) carriers to begin transmission of enhanced location and identity information in two phases. The first phase, starting on Apr. 1, 1998, required wireless service providers to transmit a 911 caller's number and section of the cell site from which the call is originated to a public safety answering point (PSAP). The second phase, starting on Oct. 31, 2001, requires all wireless service providers to locate two-thirds of all 911 callers within 125 meters of their physical locations. In other words, for all 911 calls received, a PSAP must be able to pinpoint 67% of the callers within 125 meters.

Under the FCC rules, wireless communication networks and wireless telephones (or any wireless devices that can be used to call 911), must provide both the identity and location of the caller to a 911 dispatcher. To provide a caller's identity, the wireless device will furnish a device identification, e.g., a mobile identification number (MIN), indicating in most instances the telephone number of the device. To provide a caller's location, the wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

The E911 mandate has accelerated technological advances in location technology. Many new innovations have been achieved to provide solutions to a wide range of problems. However, many problems remain unsolved. One of the problems that has not been solved is to count the number of people attending an event that does not require admission tickets. For example, no one knows how many people gather at the National Mall in Washington, D.C. to enjoy the fireworks display on the Fourth of July. Similarly, no one knows how many beach-goers are sun bathing on a particular section of a popular beach on a particular day.

There are a number of existing methods for counting people. One frequently used method is to count the number of people present within a small unit area, and then multiply that count by the total number of unit areas. For example, if there are 500 people counted within a 10,000 square-foot area, and there are one million square feet, the total number of people present within that one million square-foot area is estimated to be 50,000. This method is inherently inaccurate because it erroneously assumes that the density of people throughout the whole area is constant. Indeed, at the Fourth of July gathering, for example, areas with a better view of the fireworks display tend to be more crowded than other areas. This method of counting could also be expensive if aerial photographs must be taken to delineate the area in question. In addition, this method takes many hours, and sometimes days, to complete.

A reasonably accurate count is useful for several purposes. For example, historians and the media need it to document an event while the police and event organizers use such data to better prepare for future events. In addition, a business entity may depend on the count as a basis to justify its advertising campaigns. For example, an advertiser may find it worthwhile to hire an airplane to pull an advertisement banner along a beach if there is a sufficiently large crowd of people on the beach.

Until now, wireless communication technologies have not been adapted to obtain an estimate of the number of people congregated within a geographical area. Until now, no wireless devices have been used to survey the opinion of people gathered within a certain area. Until now, there is no method for delivering an instantaneous result for a query broadcast to all people located within a specific location. In short, there is not a wireless communications service that can perform a variety of surveys via wireless devices.

SUMMARY OF THE INVENTION

The present invention is a system and method for conducting a survey using wireless devices. The present invention comprises a location server that can communicate with a plurality of wireless devices in a wireless communication network. The location server comprises a memory, as an integral or separate component, for storing information that includes, among other things, location and identity information. The location information can comprise point coordinates, and the identity information can comprise Mobile Identification Numbers (MINs). In a preferred embodiment, point coordinates associated with a wireless device contain a longitude and a latitude.

The overall system architecture of the present invention further includes a location system. The location system can provide the location information indicating where the wireless devices are. In preferred embodiments, the location information can comprise the longitude and latitude of the wireless device. The location system can be a network-based component. The location system can determine the location of a wireless device using known methods. For example, a network-based location system could obtain position coordinates of a wireless device using triangulation across cell sites. The location system can also be a handheld unit that is part of a wireless device. An example of a handheld location system is a GPS receiver that is in communication with a constellation of GPS satellites. Finally, the location system may compromise both network-based and handheld units. In fact, a preferred embodiment of the present invention has both network-based and handheld location systems that can provide redundancy and increased accuracy.

A method for using the present invention comprises a number of steps described below. First, a survey area is defined. The survey area may be defined by using a proper name (e.g., the National Mall), a general vicinity (e.g., within three miles of the Atlanta Hartsfield International Airport), or any other definitions. Second, the survey area is delineated. Delineation of the survey area may be done using any known methods, including the use of at least three nodes each of which can comprise point coordinates. Third, at least one antenna can be used to broadcast a wireless signal that contains the survey. Fourth, one or more wireless devices that received the survey can transmit a response to the location server. The response may be created with or without intervention from the user of the wireless device. Fifth, location information that pinpoints the location of the wireless devices can be generated by a location system. The location information may be transmitted to the location server as part of the response, or it may be transmitted separately. Sixth, responses received from wireless devices located outside the survey area, if any, can be filtered out. Seventh, the remaining responses received from wireless devices located within the survey area can be processed in accordance with the survey. Finally, a result of the survey may be compiled and delivered.

The present invention has numerous embodiments and applications. Each of the embodiments comprises one or more of the steps described above. The steps may be implemented in any logical order, i.e., the order is not limited to the order in which the steps are described above.

In one aspect of the invention, the response received from a wireless device can further include an identification information of the wireless device.

Accordingly, it is an object of the present invention to augment the utility of wireless devices.

It is another object of the present invention to obtain an instantaneous count of the number of wireless devices operating within a survey area.

It is another object of the present invention to estimate the number of people gathered in the survey area.

It is another object of the present invention to survey the people present within the survey area.

It is another object of the present invention to track the whereabouts of wireless devices operating within the survey area.

These and other objects of the present invention are described in greater detail in the detailed description of the invention, the appended drawings, and the attached claims.

DETAILED DESCRIPTION OF THE INVENTION

Figure 1:
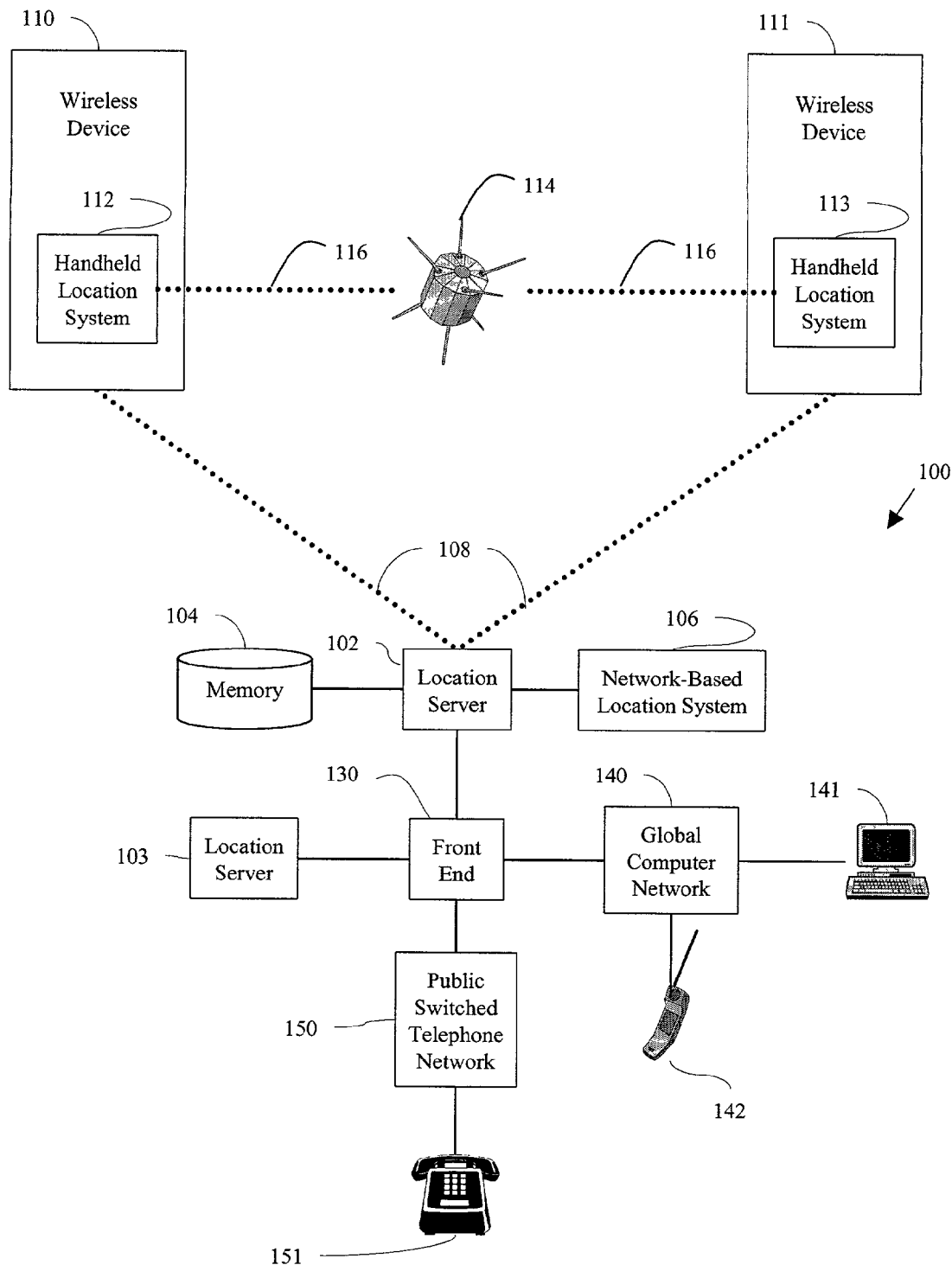
FIG. 1 is a schematic diagram illustrating an overview of the system architecture of an embodiment the present invention.

FIG. 1 is a schematic diagram showing an overview of the system architecture of an embodiment of the present invention. The present invention comprises location server 102, memory 104, at least one of wireless device 110 and wireless device 111, and at least one wireless communication link 108. Wireless devices 110 and 111 may be any wireless apparatus. For example, wireless devices 110 and 111 may be wireless telephones, handheld computers, personal digital assistants, or interactive pagers. Each of the components described above is a part of a wireless communication network 100.

To track the location of wireless device 110, the system architecture can include one or both of network-based location system 106 and handheld location system 112. Network-based location system 106 may be an integral or a separate component of location server 102. Handheld location system 112 can be an integrated component of wireless device 110. One or both of network-based location system 106 and handheld location system 112 can generate location information pinpointing the location of wireless device 110. In preferred embodiments, the location information comprises point coordinates of wireless device 110. In an exemplary embodiment of the present invention, the point coordinates can comprise a longitude and a latitude, indicating the geographic location of the device. For increased accuracy, the point coordinates may further comprise an altitude.

In preferred embodiments, the present invention further comprises front end 130, which is an intermediary wireless network component that connects location server 102 to global computer network 140 and public switched telephone network (PSTN) 150. Front end 130 can interface with at least one location server, including location server 102 and location server 103. As indicated in FIG. 1, global computer network 140 and PSTN 150 are accessible by various equipment, including computer 141, wireless telephone 142, and wireline telephone 151.

Location server 102 is a server that can receive requests from subscribers to survey wireless devices located within a specific area at a specific time. Location server 102 in preferred embodiments is a component that is compatible with GPS, Geographic Information Systems (GIS), and Wireless Appliance Protocol (WAP). Requests from customers may be received via a number of channels, including through global computer network 140 and PSTN 150. Location server 102 can receive, in conjunction with, or in lieu of, voice signals and data messages, a response from wireless device 110. The response may comprise one or both of location information and identity information of wireless device 110. Furthermore, location server 102 can process the response to accomplish specific goals. For example, location server 102 could use the response to count the number of wireless devices located within a specific area. Location server 102 could also use the response to determine, at any given time, the identity of wireless device 110, including the telephone number and the name of the user of wireless device 110.

In preferred embodiments of the present invention, location server 102 is a Wireless Application Protocol (WAP) server. WAP is an application environment and set of communication protocols for wireless devices designed to enable manufacturer-, vendor-, and technology-independent access to global computer network 140 and advanced wireless telephony services. An example of global computer network 140 is the Internet. WAP provides wireless Internet access through digital cellular networks, giving network users a menu driven method for downloading information, such as flight schedules and bank account balances, to wireless devices from the Internet. WAP is described in WAP version 1.1, which is herein incorporated by reference in its entirety.

Although shown as a separate component in FIG. 1, memory 104 could be an integrated component of location server 102. Memory 104 can store, for example, the response and other information received by location server 102. In addition, memory 104 may be populated with, among other things, MINs of wireless devices, subscriber information, and a database that contains point coordinates of any location served by wireless communication network 100, including point coordinates of all antennas or base stations for broadcasting wireless signals in the network. In addition, memory 104 can contain a database associating popular places with their location information including longitudes and latitudes.

Wireless device 110 operates over wireless communication network 100. In preferred embodiments, wireless device 110 can provide means by which to exchange data. Familiar examples include interactive pagers, wireless telephones, personal digital assistants, and handheld computers with text messaging capabilities. Preferably, wireless device 110 is a WAP-compatible thin client having a thin browser adapted to communicate with location server 102 and to access global computer network 140.

Handheld location system 112 and network-based location system 106 can provide location server 102 with the location information of wireless device 110. Depending on the desired degree of accuracy, one or both of location systems 106 and 112 can be used to determine the location of wireless device 110. In preferred embodiments, both location systems 106 and 112 can be used to provide redundancy and increased accuracy. Network-based location system 106 is preferably WAP compatible that is capable of generating location information for a plurality of wireless devices. Network-based location system 106 may also be a component using Geographic Information Systems (GIS) technology. Handheld location system 112 is preferably a GPS receiver provisioned in wireless device 110. The GPS receiver is in wireless communication, via communication link 116, with a constellation of GPS satellites including satellite 114.

Interactions among the various components described above have a large number of applications for wireless communications. For the purposes of demonstration, some specific embodiments or examples of how the present invention may be implemented are discussed below. Although the examples best illustrate the present invention, one of ordinary skill in the art would appreciate that other embodiments are possible in light of the disclosure. In addition, while the system operation described herein and illustrated in the diagrams and flowcharts contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Figure 2:
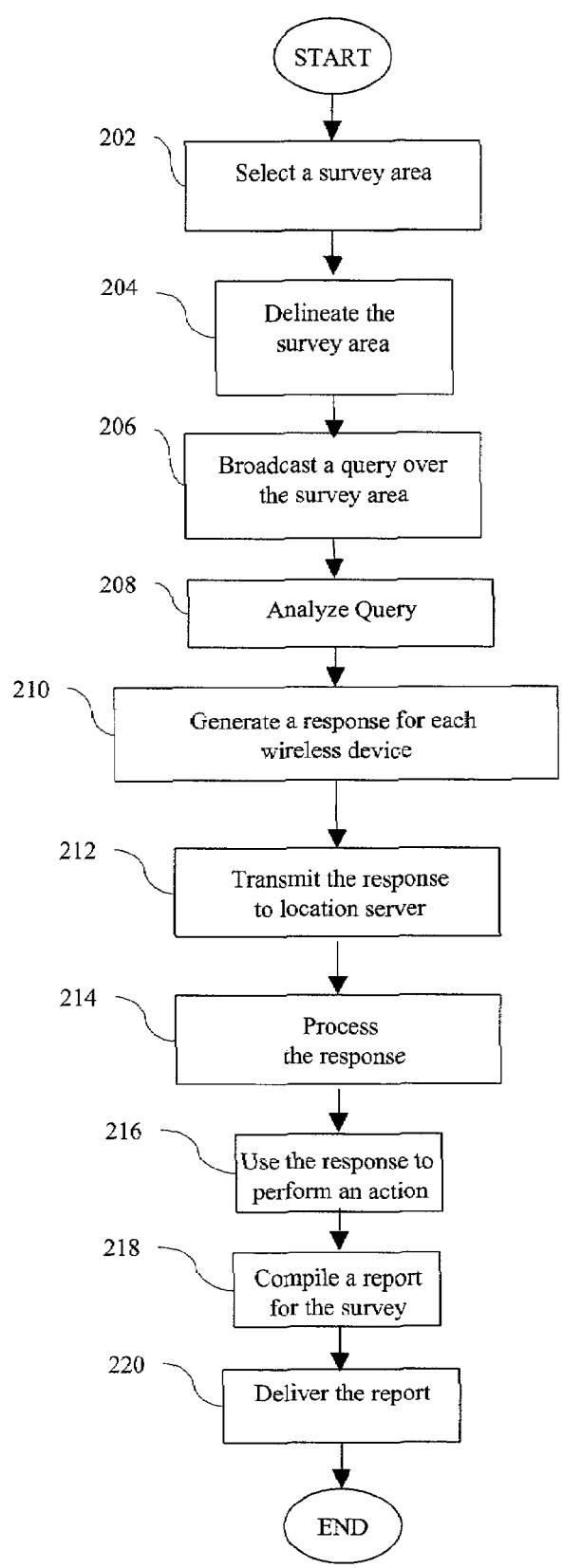
FIG. 2 is a flowchart illustrating the general steps involved in using an embodiment of the present invention.

FIG. 2 is a flowchart illustrating the general steps involved in using an embodiment of the present invention. In any specific embodiment, one or more of these general steps may be used. Furthermore, each of the general steps may include one or more sub-steps. Although these general steps and sub-steps are discussed herein sequentially, the steps may be implemented in any combination and in any logical order to accomplish a specific purpose. Furthermore, specific embodiments of the present invention may include additional steps not described.

In step 202, a survey area is selected. The selection of the survey area may be done by any entity including without limitation, a wireless service provider, a customer of the wireless service provider, a local government, the police, the media, or any business entities or individuals. For convenience, the entity is referenced hereinafter as "the subscriber." The selection may be provided by the subscriber to a location server (e.g., location server 102 shown in FIG. 1) using, among other channels of communication, global computer network 140 or PSTN 150. In preferred embodiments, the selection can be provided to location server 102 via front end 130. The subscriber may access global computer network 140 and PSTN 150 via computer 141, wireless telephone 142, wireline telephone 151, or a combination of these devices. The subscriber may provide the name of the survey area using various designations, including: a proper name, e.g., "the National Mall"; street intersections, e.g., "within 500 feet of the intersection of Peach Road and Maple Avenue"; a section of a city, e.g., "the Northwest section of Washington, D.C."; or a particular floor of a high rise building, e.g., "the fifty-third floor of the Empire State Building."

In step 204, the survey area is delineated. Delineation of the survey area may be done using any known methods. One method of delineation is by using nodes. At least three nodes are necessary to delineate a two-dimensional area, and at least four nodes are required to delineate a three dimensional space. Each of the nodes comprises point coordinates that are preferably identified by longitude, latitude, and, in some cases, altitude of the node. Preferably, the delineation is performed by location server 102 using information stored in memory 104. Preferably, location server 102 and memory 104 are adapted to use GIS technology.

In step 206, a query in the form of a wireless signal can be broadcast over the survey area. The query can be structured in accordance with a survey specified by the subscriber. The query can be broadcast via at least one antenna or base station that has wireless coverage over the survey area. Preferably, the identity of the antenna can be obtained from a database in memory 104. Depending on the level of accuracy and desired granularity, each antenna can broadcast the query over a macrocell, a microcell, or a picocell. A macrocell covers a relatively large area (e.g., about 50-mile radius). A microcell covers a smaller area (e.g., about 10-mile radius). A picocell covers an even smaller area (e.g., a tunnel or a parking garage). Depending on the nature of survey, the query may or may not be known to a user of a wireless device that receives the query. In some embodiments in which interactions from wireless device users are desirable, the query may be made known or alerted to wireless device users through ringing or vibration on the wireless devices. In addition, the query may be displayed on the wireless devices in alphanumeric characters, or recited as a voice recording.

In step 208, when a wireless device (such as wireless device 110 shown in FIG. 1) receives the query, it can analyze the query. Wireless device 110 can determine whether to respond to the query based on the conditions contained in the query. If a response is appropriate, the response can be generated in step 210. The response may or may not include input from the user of the wireless device 110. However, the response always includes location information. The location information can be provided by a location system. The location system may be handheld location system 112 or network-based location system 106, or a combination of both. The location information preferably comprises position coordinates of wireless device 110. In preferred embodiments, the position coordinates comprise a longitude and a latitude. The response also preferably comprises the MIN of wireless device 110. In preferred embodiments, the MIN could be used to retrieve the name of the wireless device user from a database.

In step 212, the response is transmitted to location server 102. Transmittal of the response may be done automatically, i.e., without intervention or consent of the user of wireless device 110. Alternatively, the transmittal may require an affirmative action by the wireless device user, such as pressing one or more keys on wireless device 110. Automatic transmittal is appropriate if the response only contains the location information. Manual transmittal is necessary if the wireless device user must supply specific information that is responsive to the query.

In step 214, location server 102 receives and processes the response. Processing of the response may include filtering, which is a determination of whether the response is received from a wireless device of interest. For example, if the location information indicates that wireless device 110 is not located within the survey area, the response is not useful to the subscriber. Filtering may be performed using any known methods, the simplest of which is by plotting the point coordinates of wireless device 110 to determine whether it falls within the delineated boundaries of the survey area.

In step 216, location server 102 can use the response to perform an action or a series of actions that are tailored specifically for the purposes of the survey. For example, if the survey is to count how many wireless devices exist within the survey area, an appropriate action would be to add all responses received from wireless devices located in the survey area. As explained in other examples discussed below, the response could be used for a wide range of purposes.

In step 218, location server 102 can compile a report documenting the survey. The report may be in the form of a text file, a voice recording, or in other suitable formats. In step 220, the report can be delivered to the subscriber. The delivery may be accomplished via any known channels, including global computer network 140 and PSTN 150. Preferably the report is delivered to the subscriber via the same channel through which the subscriber had requested the survey. As would be apparent to one ordinarily skilled in the art, the report can be prepared and delivered to the subscriber within seconds after the survey is launched.

In light of the above disclosure, there are many different embodiments through which the present invention may be implemented. Set forth below are four specific preferred embodiments of the present invention.

Figure 3:
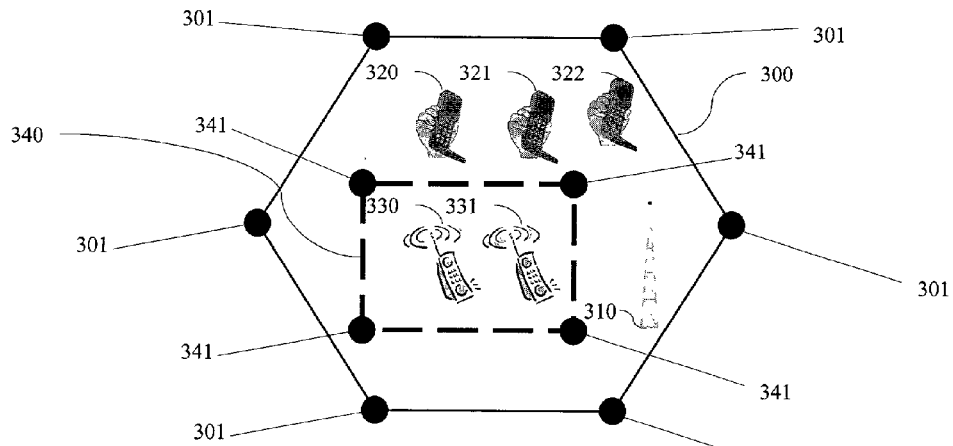
FIG. 3 is a schematic diagram showing a cell site of a wireless communication network.

FIG. 3 is a schematic diagram showing a cell site of a wireless communication network. Cell site 300 may be a macrocell, a microcell, or a picocell. Antenna 310 has wireless coverage over the entire cell site 300. A plurality of wireless devices, including wireless devices 320, 321, 322, 330, and 331 are operating within cell site 300. Survey area 340, shown in dashed lines, is delineated by a plurality of nodes 341. Wireless devices 330 and 331 are located within survey area 340, and wireless devices 320, 321 and 322 are located beyond the boundaries of survey area 340. For convenience and for the purposes of this disclosure, cell site 300 is a hexagon having six nodes 301. In reality, cell site 300 may be an irregular shape depending on radio frequency (RF) pattern of antenna 300 and other factors.

Figure 4:
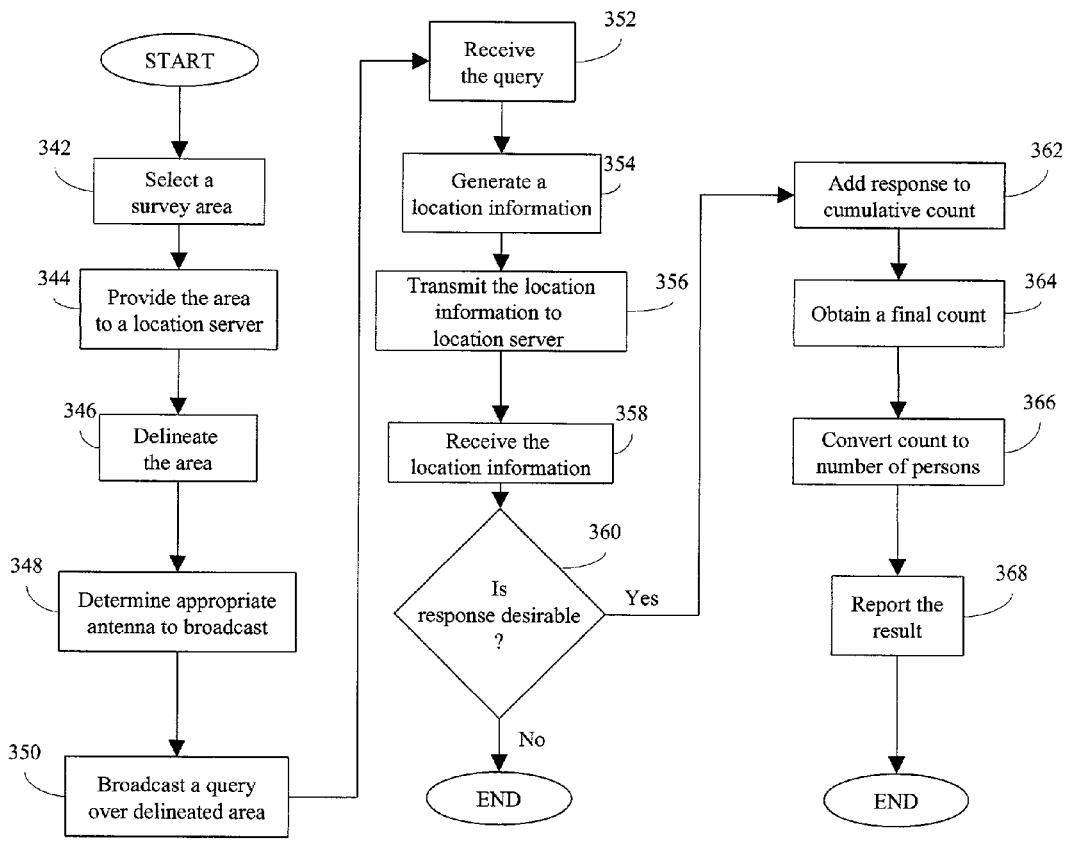
FIG. 4 is a flowchart illustrating the step involved in using a first preferred embodiment of the present invention in which an intervention from wireless device users is not required.

FIG. 4 is a flowchart illustrating the step involved in using a first preferred embodiment of the present invention in which an intervention from wireless device users is not required. There are a number of applications for this embodiment. For discussion purposes, a specific example is used. In the example, an event organizer (the subscriber) uses the present invention to conduct a survey with a limited purpose of counting the number of people attending the Fourth of July celebration at the National Mall. For clarity, references are made to features shown in FIG. 1 and FIG. 3.

In step 342, the subscriber can designate "the National Mall" as the survey area. In step 344, the subscriber can provide the survey area to a location server, such as location server 102 shown in FIG. 1, via a number of methods. For example, the survey area can be provided using wireline telephone 151 through PSTN 150 and front end 130. Front end 130 preferably has a voice recognition software that can solicit from the subscriber a plurality of street names surrounding the Mall. In step 346, location server 102 can delineate the survey area. Delineation of the area may be done using any known methods. For example, the delineation may be done using nodes 341, which define the National Mall as survey area 340 shown in FIG. 3 in dashed lines. Point coordinates associated with nodes 341 can be obtained from a memory storage, such as memory 104 shown in FIG. 1. The point coordinates of each node 341 preferably comprise a longitude and a latitude. For a survey area that is relatively flat, an altitude may not be necessary.

In step 348, a determination can be made to determine which antenna or antennas should be used. To that end, location server 102 can search information contained in memory 104. For example, location server 102 may find antenna 310 to be the most appropriate antenna because the entire survey area 340 is within wireless coverage of antenna 310. Of course, if appropriate, more than one antenna may be used.

In step 350, location server 102, in conjunction with other appropriate wireless communication components including antenna 310, can broadcast a query over cell site 300. The query is preferably in the form of a wireless signal which is receivable by all wireless devices located within cell site 300, including wireless devices 320, 321 322, 330, and 331. In this example, each of these wireless devices is equipped with a GPS receiver.

In step 352, wireless devices 320, 321, 322, 330, and 331 receive the wireless signal. The receipt of the wireless signal by each of these wireless devices can trigger the GPS receiver provisioned at each of the wireless devices to generate location information in step 354. The location information comprises a longitude and a latitude pinpointing the location of the wireless device that generated the location information at the time the location information was generated.

In step 356, a response comprising the location information can be transmitted by wireless devices 320, 321, 322, 330, and 331 to location server 102. In this embodiment, the transmittal of the response can be performed automatically by wireless devices 320, 321, 322, 330, and 331 because additional information from the users of these wireless devices is not needed to complete the survey.

In step 358, location server 102 receives the response that contains the location information. In step 360, a determination can be made on whether the response is one that which is desirable by the subscriber. For example, if the location information in the response indicates that the response is received from a wireless device is located beyond the boundaries of survey area 340, for example, a response received from one of wireless devices 320, 321, and 322, that response is considered not desirable. However, if the response is received from one of wireless devices 330 and 331, location server 102 may add that response to a cumulating count in step 362. The addition of the response may be performed using a summing circuit in location server 102. The determination on whether a wireless devices is located within survey area 340 may be done using any known methods. For example, a wireless devices is outside of survey area 340 if all latitudes of nodes 341 are south of the latitude of the wireless device.

In step 364, when all responses received by location server 102 have been processed in steps 360 and 362, a total number of wireless devices located in area 340 is obtained. The number can be an integer value. In step 366, location server 102 can convert the integer value to the number of persons present within area 340. For example, if it is assumed that each wireless device found in area 341 represents one person, then the integer value obtained in step 364 represents the number of persons located in area 340 at the time the survey was conducted. Otherwise, the integer value may be multiplied by a person-to-device ratio to arrive at the number of persons. For example, if there is a reliable source indicating that one out of five persons in cell site 300 carries a wireless device at all times, then a person-to-device ratio of five may be used as the multiplier. Finally, in step 368, the count can be reported to the subscriber via a voice message through PSTN 150 and wireline telephone 151.

Figure 5:
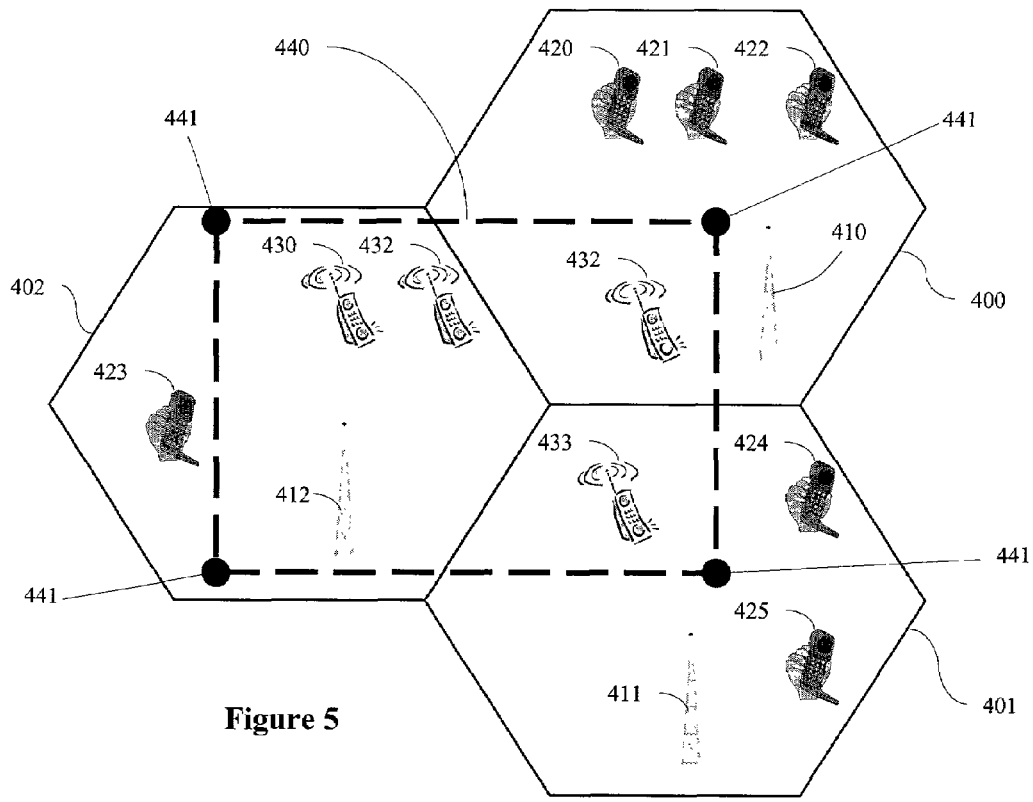
FIG. 5 is a schematic diagram showing a plurality of cell sites of a wireless communication network.

FIG. 5 is a schematic diagram showing a plurality of cell sites of a wireless communication network. Survey area 440, indicated in dashed lines and delineated by a plurality of nodes 441, is located within wireless coverage of a plurality of cell sites, namely, cell sites 400, 401, and 402. Cell sites 400, 401, and 402, are served by antennas 410, 411, and 412, respectively. Wireless devices 430, 431, 432 and 433 are located within survey area 440, and wireless devices 420, 421, 422, 423, 424, and 425 are located outside of survey area 440. Cell sites 400, 401, and 402 may be macrocells, microcells, or picocells, depending on the size of area 440.

Figure 6:
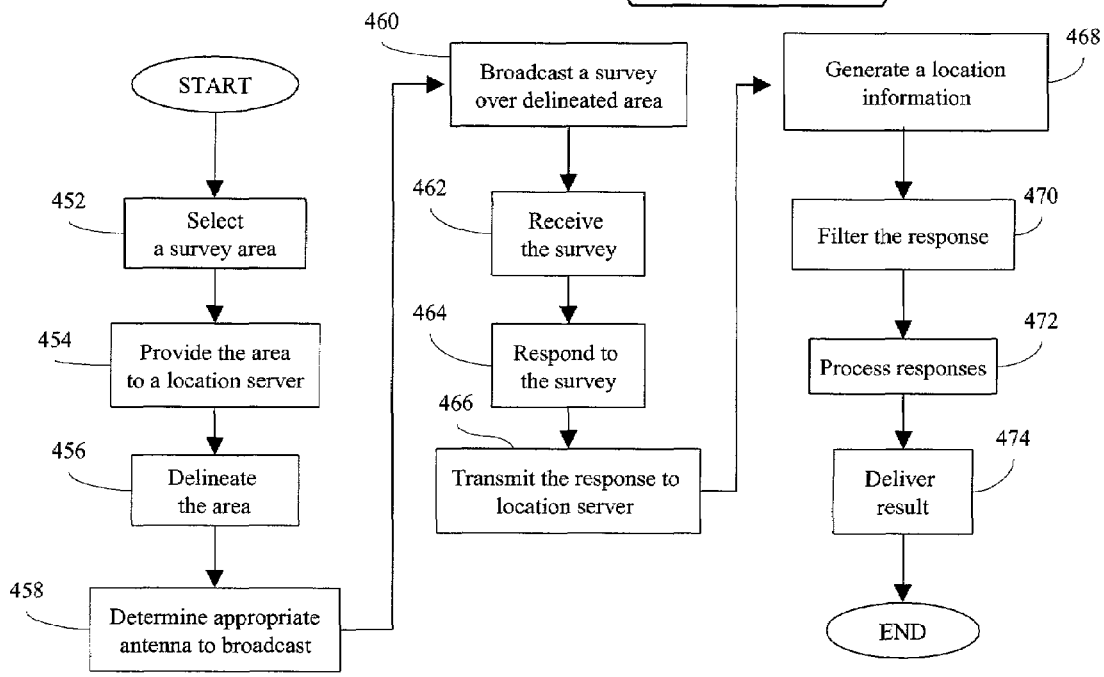
FIG. 6 is a flowchart illustrating the step involved in using a second preferred embodiment of the present invention in which an intervention from a wireless device user is required.

FIG. 6 is a flowchart illustrating the step involved in using a second preferred embodiment of the present invention in which an intervention from a wireless device user is required. For discussion purposes, a specific example is discussed herein. In the example, a subscriber desires to conduct a presidential election poll of all wireless device users in survey area 440. In this embodiment, the wireless device users cast their informal votes using their wireless devices, and the subscriber obtains an instantaneous result of the poll.

In step 452, the subscriber selects a survey area within which the presidential election poll is to be conducted. In this example, the subscriber selects survey area 440, which is a large metropolitan area. Depending on the extent of the survey, the area selected may cover a plurality of cell sites, including cell sites 400, 401, and 402 shown in FIG. 5. In step 454, the survey area is provided to a location server, such as location server 102. The survey area can be uploaded to location server 102 using computer 141 through global computer network 140 and front end 130.

In step 456, location server 102 can delineate the survey area. Delineation of the survey area may be performed using any one of several methods. For example, the survey area may be delineated using a plurality of nodes 441. Each of nodes 441 may comprise position coordinates of a coordinate system. Any coordinate system may be used including, without limitation, an X-Y, or a Cartesian coordinate system. In step 458, location server 102 can select one or more appropriate antennas. In this example, a plurality of antennas 410, 411, and 412 are selected because together these antennas can broadcast a wireless signal that covers the entire survey area 440. Each of these antenna also has point coordinates in the same coordinate system.

In step 460, location server 102 can broadcast a query in the form of a wireless signal via antennas 410, 411, and 412. The wireless signal may be coded to carry a survey comprising one or more questions. The questions may be in a voice or text format. An exemplary question may be: "Which candidate are you likely to vote for? Press or say one for the Republican candidate; press or say two for the Democratic candidate." Another question could be: "What do you consider to be the most important issue? Press or say one for national defense; press or say two for health care." The question may also be an open question, i.e., no choices are provided, such as: "Please briefly discuss, by saying or by typing, how a campaign finance reform should be implemented."

In step 462, when wireless devices 420, 421, 422, 423, 424, 425, 430, 431, 432, and 433 receive the query, the users of these wireless devices can be alerted to the query, either by a ringing tone, a vibration on the devices, or other notification features of the wireless devices. The users may then hear or see the question on the wireless devices.

In step 464, the wireless device users can respond to the survey through an action or an inaction. Some of the users may press or say 1; others may press or say 2; still others may refuse to participate by pressing other keys or simply ignore the survey. Each action or inaction by the wireless device users can be considered as a response.

In step 466, the response can be transmitted to location server 102. The transmittal can be done via known wireless communication techniques. In step 468, a location system, such as network-based location system 106 shown in FIG. 1, can generate location information for each of the wireless devices that transmitted a response. Generation of the location information may be done using any known method. In this embodiment, the location information can be generated using triangulation among cell sites. For example, the point coordinates of wireless device 430 or wireless device 420 may be determined based on distances from antennas 410, 411, and 412. Point coordinates of these antennas may be retrieved from a memory, such as memory 104 shown in FIG. 1. Alternatively, the location information may be generated by a handheld location system, such as a GPS receiver, that is part of the wireless device. The location information preferably contains point coordinates of the corresponding wireless device using the same coordinate system as the point coordinates of the antennas.

In step 470, location server 102 can evaluate each response to determine whether it was generated by a wireless device from survey area 440. The location server in essence, filters out any and all responses received from wireless devices 420, 421, 422, 423, 424, and 425.

In step 472, only responses received from wireless devices 430, 431, 432, and 433 are processed. Processing of the responses involves categorizing the responses into three groups: (1) the number of users who voted for the Republican candidate; (2) the number of users who voted for the Democratic candidate; and (3) the number of users who received the survey but did not vote for either candidate. In addition, further processing of the responses may be performed, including analyzing which subsection or subsections of survey area 440 are in favor of one candidate over the other. The analysis could be used to formulate a more focused campaign by a candidate in one or more of these subsections. In step 474, the result of the survey can be compiled as a report. Also, in step 474, the report may be delivered to the subscriber via, for example, global computer network 140.

Figure 7:
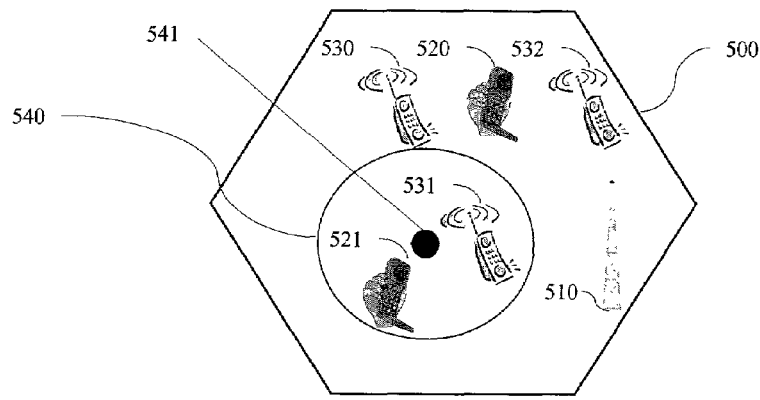
FIG. 7 is a schematic diagram showing a cell site of a wireless communication network within which a dispatch system is located.

FIG. 7 is a schematic diagram showing a cell site of a wireless communication network within which a dispatch system is located. In this embodiment, a response generated by a wireless device further comprises identity information of the wireless device in addition to location information. The identity information may include the MIN or the telephone number, if any, of the wireless device. The identity information may also comprise the name of the owner of the wireless device. The dispatch system of this embodiment may be used, for example, by a taxi company to dispatch taxi drivers. The taxi company (the subscriber) may use the identity information to contact one or more taxi drivers. As shown in FIG. 7, affiliated wireless devices 530, 531, and 532, as well as non-affiliated wireless devices 520 and 521, are located within cell site 500.

Figure 8:
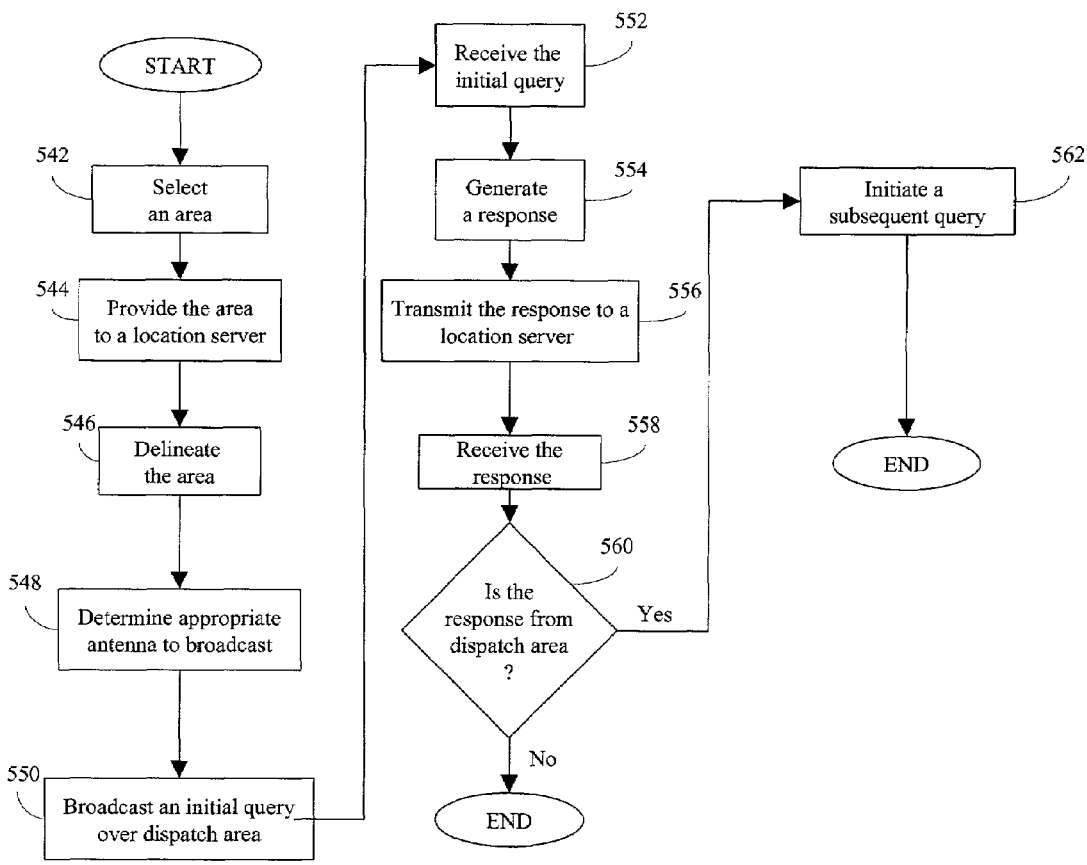
FIG. 8 is a flowchart illustrating the step involved in using the third preferred embodiment of the present invention as a dispatch system.

FIG. 8 is a flowchart illustrating the steps involved in using the third preferred embodiment of the present invention as the dispatch system. In step 542, a survey area for dispatching is selected by the subscriber. For example, the survey or dispatch area may be "within three miles of the Atlanta Hartsfield International Airport." For example, circle 540 may represent the dispatch area. In step 544, the subscriber can provide information related to dispatch area 540 to a location server, such as location server 102 shown in FIG. 1. Communication between the subscriber and location server 102 may be established via any known method. In step 546, location server 102 can delineate dispatch area 540. Delineation of dispatch area 540 may be done using any known method. In this embodiment, the delineation is done using a circle having a three-mile radius from the center point of the Atlanta Hartsfield International Airport, which is shown as node 541 in FIG. 7. Preferably, point coordinates of center node 541, can be obtained from a memory storage, such as memory 104 shown in FIG. 1.

In step 548, an appropriate antenna can be selected to transmit signals. To that end, location server 102 can search information contained in memory 104, and it may find antenna 510 to be the most appropriate antenna because the entire dispatch area 540 is within wireless coverage of antenna 510. The search may not necessary if it is well known that the dispatch area of the taxi company is always within the coverage of antenna 510.

In step 550, location server 102, in conjunction with other appropriate wireless communication components including antenna 510, can broadcast an initial query over cell site 500. The initial query can be in the form of a wireless signal encoded such that the initial query is intelligible only by wireless devices that are affiliated with the subscriber, including wireless devices 530, 531, and 532. The wireless signal can be encoded such that other wireless devices such as non-affiliated wireless devices 520 and 521, will not process the initial query even though these wireless devices are located within cell site 500.

In step 552, affiliated wireless devices 530, 531, and 532 receive and process the initial query. The receipt of the initial query by each of the affiliated wireless devices can trigger the wireless devices to generate an automatic response in step 554. The automatic response can comprise location information. The location information may be created by a handheld location system. A GPS receiver is an example of a handheld location system. In this embodiment, the location information comprises point coordinates pinpointing the location of a wireless device. The point coordinates preferably comprise a longitude and a latitude. Additional information, such as identity information of the affiliated wireless device, can then be added to the automatic response. The identity information may include, among other things, one or more of the MIN of the affiliated wireless device, the telephone number of the affiliated wireless device, and the name of the owner of the affiliated wireless device. In step 556, the automatic response can be transmitted to location server 102.

In step 558, location server 102 receives the automatic response. In step 560, a determination can be made on whether the automatic response came from an affiliated wireless device that is located in dispatch area 540. For example, if the point coordinates contained in the automatic response indicate that the automatic response is received from affiliated wireless device 530 that is located beyond circle 540, that automatic response is considered not desirable. Otherwise, if the automatic response is received from affiliated wireless device 531 that is located within circle 540, the response is forwarded to be processed in step 562. In step 560, location server 102 could also verify the identity information to make sure that it came from a wireless device that is still in affiliation with the subscriber. Verification can be done by checking a database accessible by location server 102.

In step 562, location server 102, in conjunction with other components of the wireless communication network, can initiate a subsequent query directed specifically to affiliated wireless device 531. The subsequent query may be a voice message or a text message informing the user of affiliated wireless device 531 to pick up a passenger at the Atlanta Hartsfield International Airport.

Figure 9:
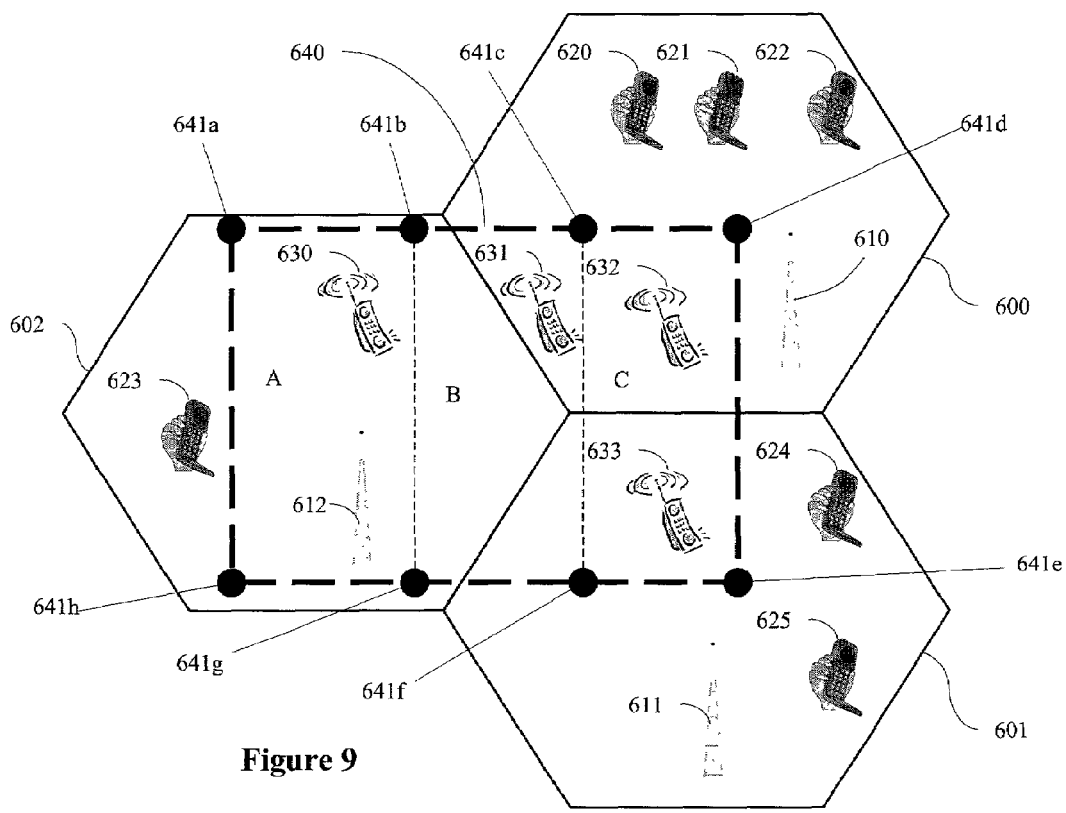
FIG. 9 is a schematic diagram showing a plurality of cell sites of a wireless communication network serving a large metropolitan area.

FIG. 9 is a schematic diagram showing a plurality of cell sites of a wireless communication network serving a large metropolitan area. Survey area 640, indicated in dashed lines and delineated by a plurality of nodes 641a through 641h, is located within wireless coverage of a plurality of cell sites 600, 601, and 602. Each of the plurality of cell sites is served by antennas 610, 611, and 612. Wireless devices 630, 631, 632, and 633 are located within survey area 640, and wireless devices 620, 621, 622, 623, 624, and 625 are located beyond the boundaries of survey area 640. Cell sites 600, 601, and 602 may be macrocells, microcells, or picocells.

Figure 10:
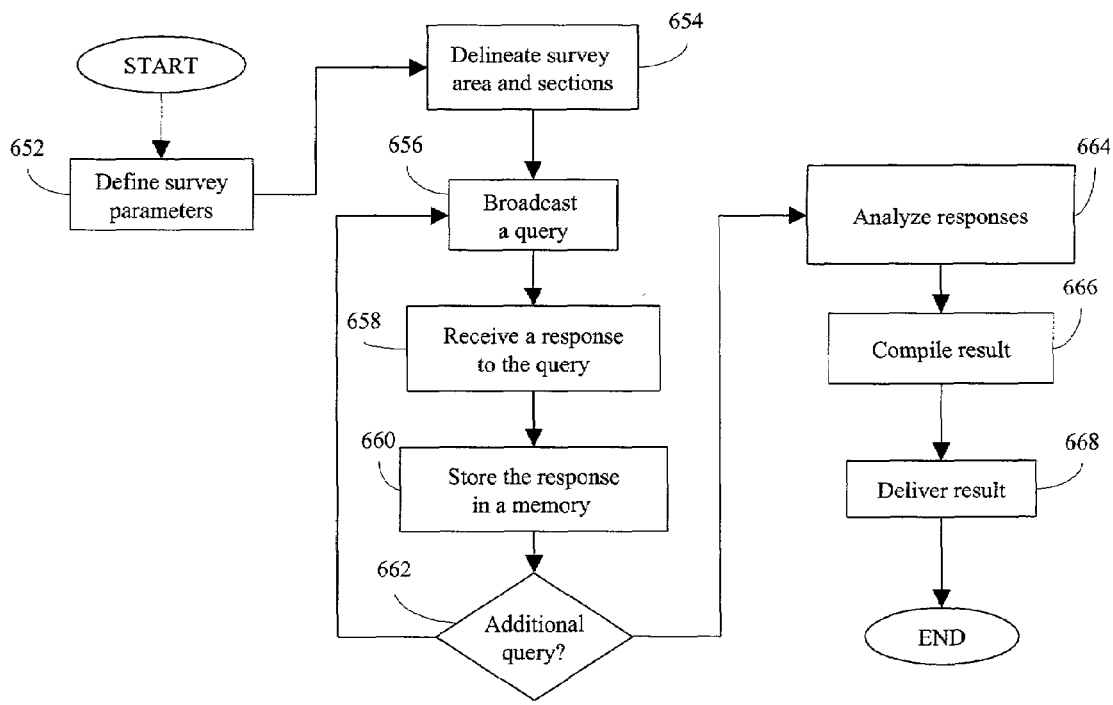
FIG. 10 is flowchart illustrating the step involved in using a fourth preferred embodiment of the present invention to track movements of wireless devices within the large metropolitan area.

FIG. 10 is a flowchart illustrating the steps involved in using a fourth preferred embodiment of the present invention to track movements of wireless devices located within a large metropolitan area. For discussion purposes, a specific example is discussed herein. In the example, a subscriber desires to track the movement of people carrying wireless devices 630, 631, 632, and 633 within survey area 640 shown in FIG. 9. For instance, the subscriber wishes to know the distribution pattern of wireless devices 630, 631, 632, and 633 in three sections: namely, Sections A, B, and C, defined by nodes 641a–641b–641g–641h, nodes 641b–641c–641f–641g, and nodes 641c–641d–641e–641f, respectively. A result obtained from such survey is helpful, for example, for transportation planning purposes.

In step 652, the subscriber can define a set of parameters for the survey. The parameters may include, for example, the number of queries to be broadcast and the time at which each query is to be broadcast. For example, the subscriber may decide that a distribution pattern of wireless devices 630, 631, 632, and 633 for each section of survey area 640 is needed every hour on the hour between 5 a.m. and 7 p.m. Each count shows the number of wireless devices 630, 631, 632, and 633 in each Sections A, B, and C. The set of parameters is then provided to a location server, such as location server 102 shown in FIG. 1.

In step 654, the survey area is delineated. For example, nodes 641a through 641h can be used to delineate survey area 640 and Sections A through C, as shown in FIG. 9. Sections A, B, and C may represent the residential, business, and entertainment districts of the metropolitan area, respectively.

In step 656, a initial query is broadcast. The query is preferably in the form of a wireless signal as described in earlier embodiments discussed above. The broadcast is performed via, among other components of the wireless communication network, antennas 610, 611, and 612, over the survey area. In this specific example, a first query is broadcast at 5 a.m.

In step 658, a response from each of wireless devices 630, 631, 632, and 633 is received by location server 102. In step 660, the response can be stored in a memory, such as memory 104 shown in FIG. 1. In step 662, a determination can be made on whether a subsequent query must be broadcast based on the parameters defined in step 652. The process repeats steps 656 through 662 as long as there is a subsequent query to be broadcast. In this example, these steps are repeated every hour on the hour between 5 a.m. and 7 p.m. The last query is broadcast at 7 p.m.

If, in step 662, it is determined that there is no subsequent query to be broadcast, i.e., it is after 7 p.m., the process moves on to step 664 in which all responses received in step 658 can be analyzed. The analysis may include, for example, reviewing the fluctuations of wireless device density in each of Sections A, B, and C. The analysis could also provide data on the flow of movements, e.g., do people tend to move from Section B to Section A or from outside area 640 in, etc. In step 666, a result of analysis is compiled. The result may be presented in the form of a table, a chart, or a graph. In step 668, the report can be delivered to the subscriber.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system for conducting a survey using wireless devices located within a survey area served by a wireless communication network comprising:
   a wireless device characterized by a location, wherein the wireless device is in the survey area and receives a broadcast survey; and
   a location system in communication with the wireless device,
   wherein the location system generates location information, pinpointing the location of the wireless device when the wireless device receives the survey; and
   wherein the wireless device generates a response to the survey when the survey is received, the location information being included in the response.

2. The system of claim 1, wherein the wireless device is a wireless telephone.

3. The system of claim 1, wherein the wireless device is an interactive pager.

4. The system of claim 1, wherein the wireless device is a handheld computer.

5. The system of claim 1, wherein the location system is a unit provisioned at the wireless device.

6. The system of claim 5, wherein the location system is a GPS receiver.

7. The system of claim 1, wherein the location system is a network-based unit.

8. The system of claim 7, wherein the location system uses GIS technology.

9. The system of claim 7, wherein the location system is a WAP compatible system.

10. The system of claim 1, further comprising a memory accessible by the location system, wherein the memory storage comprises a database populated with a plurality of nodes, wherein each of the plurality of nodes is defined by position coordinates.

11. The system of claim 10, wherein the position coordinates comprise a longitude and a latitude.

12. The system of claim 1, wherein the location information comprises position coordinates of the wireless device.

13. The system of claim 12, wherein the position coordinates comprise a longitude and a latitude.

14. The system of claim 1, further comprising calculating a number of people located within the survey area.

15. The system of claim 12, wherein the response comprises identity information.

16. A method for conducting a survey using wireless devices located within a survey area comprising:
   receiving a query containing the survey over the survey area at a plurality of wireless devices;
   determining at each wireless device whether the wireless device responds to the query; and
   generating a response for each of the plurality of wireless devices that responds to the query, the response comprising at least location information generated by a location system, the location information indicating the location of the wireless device.

17. The method of claim 16, further comprising verifying the response is received from a wireless device that is located within the survey area.

18. The method of claim 16, further comprising delineating the survey area.

19. The method of claim 18, wherein delineating the survey areas uses at least three nodes.

20. The method of claim 18, wherein each of the at least three nodes is defined by point coordinates.

21. The method of claim 19, wherein the point coordinates comprise a longitude and a latitude.

22. The method of claim 16, wherein the location information comprises point coordinates.

23. The method of claim 22, wherein the point coordinates comprise a longitude and a latitude.

24. The method of claim 16, further comprising the step of delineating the survey area using a node and a radius.

25. The method of claim 16, further comprising determining a number of wireless devices within the survey area based at least in part upon the response.

26. The method of claim 16, further comprising determining a number of people within the survey area based at least in part upon the response.

27. The method of claim 16, wherein the query comprises a question directed to a plurality of users of the plurality of wireless devices.

28. The method of claim 27, wherein the response further comprises an answer to the question provided by the plurality of users.

29. The method of claim 28, wherein the answer comprises a null response.

30. A method for conducting a survey using wireless devices within a survey area comprising:
 (a) delineating the survey area;
 (b) broadcasting a query to at least one wireless device via at least three antennas, wherein each of the at least three antennas has antenna position coordinates;
 (c) receiving device position coordinates for a wireless device in response to receipt of the query at a wireless device, the device position coordinates using the antenna position coordinates of the at least three antennas and relative position of the wireless device to each antenna;
 (d) verifying the response is received from a wireless device that is located within the survey area; and
 (e) executing an action based on the response.

31. The method of claim 30, wherein the response further comprises an input from a person using the wireless device.

32. The method of claim 31, wherein the input comprises a numerical value.

33. The method of claim 31, wherein the input comprises an alphanumeric message.

34. The method of claim 31, wherein the input comprises a voice message.

35. A method for dispatching a service in a dispatch area comprising:
 (a) broadcasting a query over the dispatch area;
 (b) receiving a response to the query, wherein the response comprises wireless device location information and wireless device identity information for a wireless device generating the response;
 (c) using the response to dispatch the service if the location information and the identity information satisfy a criterion.

36. The method of claim 35, wherein the criterion comprises a match of the identity information and an affiliated wireless device.

37. The method of claim 35, further comprising using the location information to verify that the wireless device is located within the dispatch area.

38. The method of claim 35, further comprising using the identity information to verify that the wireless device is an affiliated wireless device.

39. The method of claim 35, further comprising delineating the dispatch area.

40. The method of claim 39, wherein the act of delineating the dispatch area uses at least three nodes.

41. The method of claim 40, wherein each of the at least three nodes is defined by point coordinates.

42. The method of claim 41, wherein the point coordinates comprise a longitude and a latitude.

43. The method of claim 35, wherein the location information comprises point coordinates.

44. The method of claim 43, wherein the point coordinates comprise a longitude and a latitude.

45. The method of claim 35, further comprising the step of delineating the dispatch area uses a node and a radius.

46. The method of claim 45, wherein the node comprises a longitude and a latitude.

47. A method for conducting a survey using wireless devices in a survey area comprising:
 defining survey parameters;
 broadcasting a plurality of queries over the survey area according to the survey parameters;
 receiving a response to the query for each of the wireless devices, the response including wireless device location information indicating position coordinates of the wireless device at time of receipt of each query at the wireless device;
 receiving a plurality of responses to the query from the wireless devices, wherein a response from each of the wireless devices comprises the wireless device location information pinpointing the location of the wireless device when the wireless device receives the query; and
 using the responses to perform an action.

48. The method of claim 47, wherein the survey parameters comprise a plurality of times for broadcasting the query.

49. The method of claim 47, wherein the action comprises determining a distribution pattern for the wireless devices in the survey area.

50. The method of claim 47, further comprising the step of delineating the survey area.

51. The method of claim 50, wherein the step of delineating the survey area uses at least three nodes.

52. The method of claim 50, wherein the step of delineating the survey area uses a node and a radius.

53. The method of claim 47, wherein the survey area further comprises a plurality of sections.

54. The method of claim 53, wherein the action comprises determining a distribution pattern of wireless devices in each of the plurality of sections.

55. The method of claim 50, further comprising the step of delineating each of the plurality of sections uses at least three nodes.

56. The method of claim 50, further comprising the step of delineating each of the plurality of sections using a node and a radius.

* * * * *